United States Patent [19]

Heideman

[11] Patent Number: 4,702,355

[45] Date of Patent: Oct. 27, 1987

[54] SHOCK ABSORBER WITH HOLE-ON-GROOVE CONFIGURATION AND WITH ADJUSTING DEVICE

[75] Inventor: Robert J. Heideman, Westland, Mich.

[73] Assignee: Enertrols, Inc., Westland, Mich.

[21] Appl. No.: 742,408

[22] Filed: Jun. 7, 1985

[51] Int. Cl.⁴ .............................................. F16F 9/48
[52] U.S. Cl. ................................. 188/285; 137/625.3; 188/287
[58] Field of Search ............... 188/287, 286, 285, 284, 188/318, 299, 288, 277–278, 276, 282, 281, 315, 314, 316, 317, 322.19, 322.13; 267/8 R, 124, 118, 64.15, 64.26; 251/343–345, 259; 137/625.3, 625.32; 213/43; 138/42–46

[56] References Cited

U.S. PATENT DOCUMENTS

| | | | |
|---|---|---|---|
| 3,344,894 | 10/1967 | Kenworthy | 188/287 |
| 3,693,767 | 9/1972 | Johnson | 188/287 X |
| 3,840,097 | 10/1974 | Holley | 188/287 |
| 4,059,175 | 11/1977 | Dressell, Jr. et al. | 188/287 X |
| 4,071,122 | 1/1978 | Schupner | 188/287 X |
| 4,174,098 | 11/1979 | Baker et al. | 188/287 X |
| 4,205,753 | 6/1980 | Raeber | 188/287 X |
| 4,298,101 | 11/1981 | Dressell, Jr. et al. | 188/287 X |
| 4,471,809 | 9/1984 | Thomsen et al. | 137/625.3 X |
| 4,482,035 | 11/1984 | Heideman et al. | 188/287 |

Primary Examiner—Douglas C. Butler
Attorney, Agent, or Firm—Krass & Young

[57] ABSTRACT

A shock absorber for providing a linear decelerating force to a machine part by the use of a piston which forces fluid through a series of metering orifices formed by coaction of holes in the piston cylinder and internal annular grooves formed in a metering sleeve which fits over the cylinder. An infinite number of adjustments in the shock absorber characteristics are achieved by moving the grooves in the metering sleeve in orbital pattern relative to the holes in the cylinder. The annular grooves have a semicircular cross section to provide smooth flow through the metering passages and to concentrate the pressure drop in the shock absorber as turbulent flow occurring at the metering point defined by the overlap between the semicircular annular grooves and the associated holes in the cylinder.

1 Claim, 7 Drawing Figures

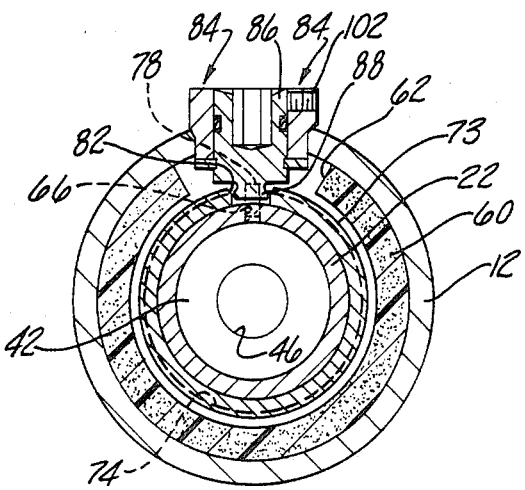
*Fig-2*
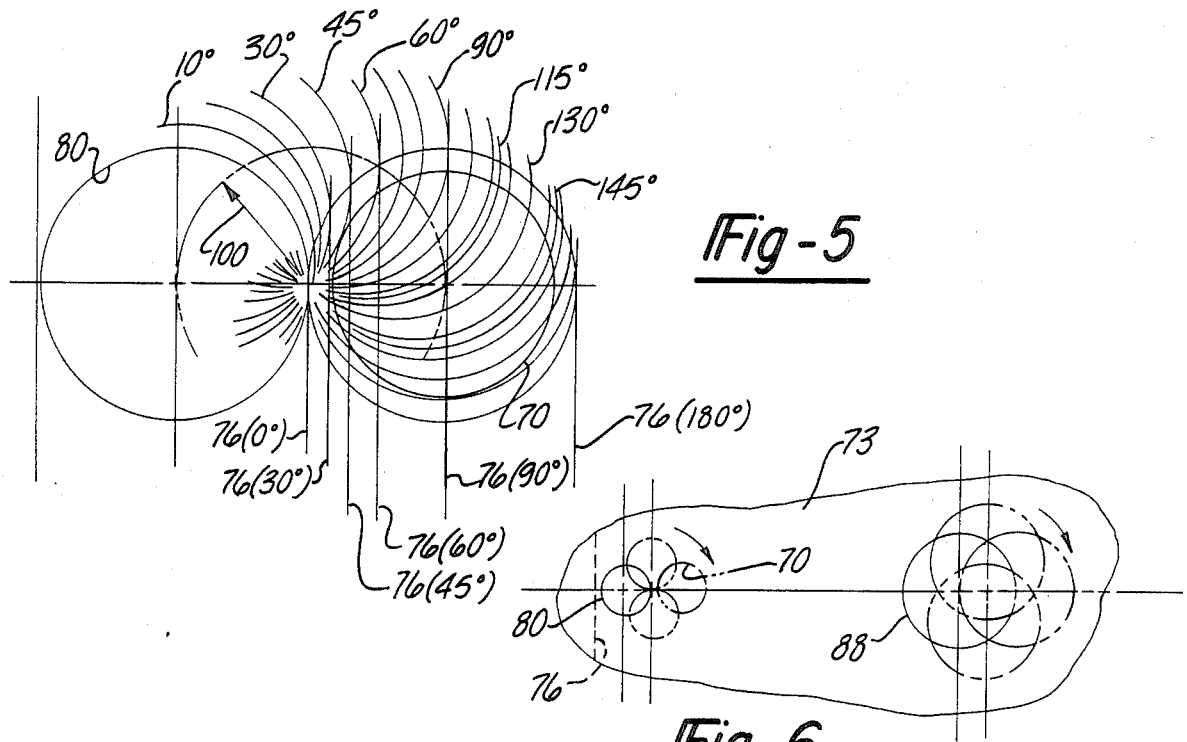
*Fig-5*
*Fig-6*
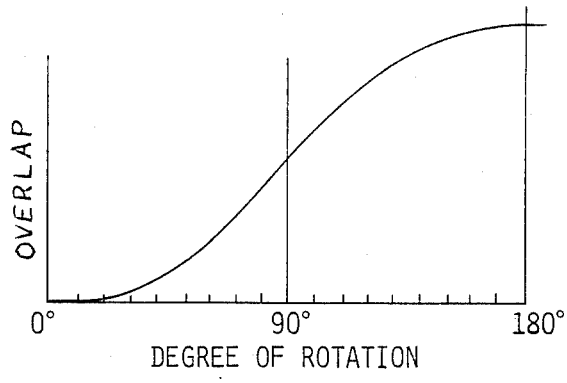
*Fig-7*

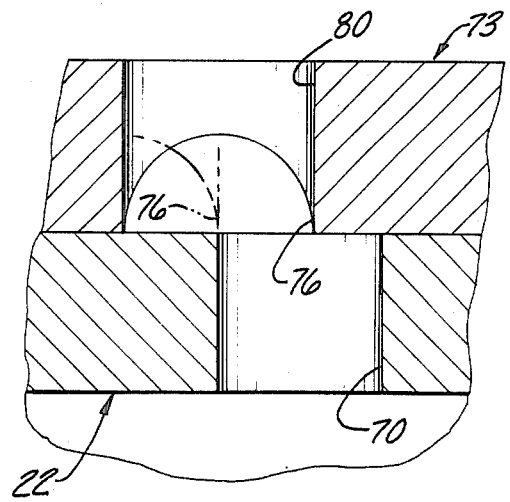
_Fig-3_
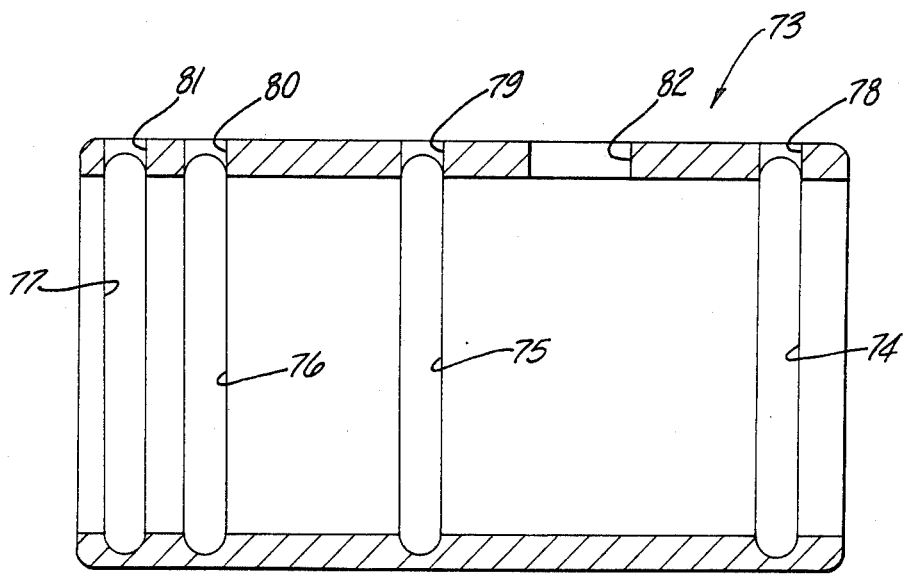
_Fig-4_

SHOCK ABSORBER WITH HOLE-ON-GROOVE CONFIGURATION AND WITH ADJUSTING DEVICE

BACKGROUND OF THE INVENTION

This invention relates to shock absorber devices for linearly decelerating a machine part by imposing a relatively constant force to the part over the stroke of the device and, more particularly, to a device wherein the constant decelerating force may be adjusted for use with machine parts having different weights and velocities.

Shock absorbers which force fluid through a restricted orifice to convert the kinetic energy of a moving part into an increase in the thermal energy of the fluid are commonly used on machines. The smoothest deceleration of the moving part is obtained by absorbers which offer a constant resistive force to the motion over the total length of the deceleration.

One class of such devices employs a piston connected to the machine part and movable within a cylinder having a closed end. A series of exponentially spaced holes are formed along the length of the cylinder wall and the cylinder is supported within a housing filled with fluid. As the piston is forced into the cylinder by motion of the machine part, the fluid is forced through the holes and the kinetic energy of the part is converted into thermal energy of the fluid. As the piston moves down the cylinder, it successfully closes off the holes so that the force imposed on the load is maintained relatively constant resulting in a linear deceleration of the moving part.

The force imposed on the part is a function of the configuration of the fluid orifice and linear decelerators of this class have been designed wherein the orifice configuration may be varied to accommodate the device for use with parts having varying weights and kinetic energy. One of the most common approaches is to provide grooves in a tubular sleeve fitting over the cylinder. The grooves in the sleeve cooperate with holes in the cylinder to define the fluid orifices. The angular or axial position of the sleeve on the cylinder may be adjusted to vary the orifice configuration and thus the resistance provided to the load. Representative examples of the so-called "groove on hole" shock absorbers are disclosed in commonly assigned U.S. Pat. Nos. 4,059,175; 4,298,101; and 4,321,987, as well as the disclosures in U.S. Pat. No. 3,425,522 to Gryglas and U.S. Pat. No. 3,693,767 to Johnson. Whereas shock absorbers of the groove on hole configuration have proven to be generally satisfactory in operation, the prior art groove designs have been rather complex resulting in high initial manufacturing costs; the prior art groove designs have tended to encourage laminar flow upstream and downstream of the metering orifice with a resultant variation in shock absorbing performance for a given setting as the temperature of the hydraulic fluid varies with usage; the prior art groove designs have tended to create areas of stress concentration in the sleeve so as to create a potential failure mode within the sleeve; and the prior art groove designs have tended to create areas of intensified errosive wear resulting from bombardment from contaminates in the hydraulic fluid.

SUMMARY OF THE INVENTION

This invention is directed to the provision of a shock absorbing device wherein substantially all of the fluid resistance in the device occurs at the metering orifice and is substantially turbulent so that the device is largely insensitive to variations in the temperature of the hydraulic fluid occurring over periods of usage.

This invention is further directed to the provision of a shock absorbing device of a groove on hole type which may be readily and inexpensively manufactured.

The shock absorber device according to the invention includes a tubular cylinder having a plurality of longitudinally spaced holes; a piston slideable within the cylinder and adapted to be contacted by the moving member whose motion is to be damped; and a sleeve slideably surrounding the cylinder and having a plurality of annular internal grooves of smooth arcuate cross section corresponding in number and longitudinal spacing to the holes in the cylinder and a hole associated with each groove opening at its outer end in the outer surface of the sleeve and opening at its inner end in the associated groove to coact with that groove and with the associated hole in the cylinder to define a metering passage for hydraulic fluid. This arrangement provides a groove on hole design which is readily and inexpensively manufacturable and that concentrates the fluid restriction afforded by the device substantially at the metering orifice and ensures that the flow at the metering orifice is substantially turbulent.

According to a further feature of the invention, each internal groove in the sleeve is generally semicircular in cross section and each hole in the sleeve is generally circular and has a diameter generally corresponding to the diameter of the groove. This design provides minimum downstream restriction to the flow of fluid through the metering passage.

According to a further feature of the invention, each hole in the cylinder is generally circular and has a diameter less than the diameter of the sleeve hole. This specific relative dimensioning arrangement further serves to minimize the resistance to flow occuring downstream of the metering orifice.

According to a further feature of the invention, adjusting means are provided for creating simulataneous relative radial and axial movement between the sleeve and the cylinder so that the grooves in the sleeve move in an orbital pattern relative to the holes in the cylinder to adjust the metering passages. This arrangement enables an extremely fine adjustment of the effective orifice size to individually tailor the shock absorber characteristics for a wide range of different weights and kinetic energy of moving parts to which it is connected.

In the disclosed embodiment of the invention, the grooves lie in longitudinally spaced parallel planes normal to the axis of the cylinder and the sleeve; the grooves have a uniform cross section throughout their circumferential extent; and the holes in the sleeve are centered with respect to the associated grooves. This simple symmetrical design facilitates ready and inexpensive manufacture of the invention device and contributes importantly to the desired flow characteristics through the metering passages.

BRIEF DESCRIPTION OF THE DRAWINGS

FIG. 2 is a cross sectional view taken on line 2—2 of FIG. 1;

FIG. 3 is a detailed view taken within the circle 3 of FIG. 1;

FIG. 4 is a detailed cross sectional view of the metering sleeve used in the invention shock absorber;

FIG. 5 is a conceptual view which diagrammatically illustrates the orbiting movement of a groove in the sleeve with respect to a fixed inner hole in the cylinder;

FIG. 6 is a further conceptual view diagrammatically illustrating orbital movement of a groove in the sleeve in relationship to rotation of the cam utilized in the preferred embodiment of the invention; and FIG. 7 is a graphical depiction of the groove and hole overlap relative to cam rotation.

DETAILED DESCRIPTION OF THE PREFERRED EMBODIMENT

Figure 1:
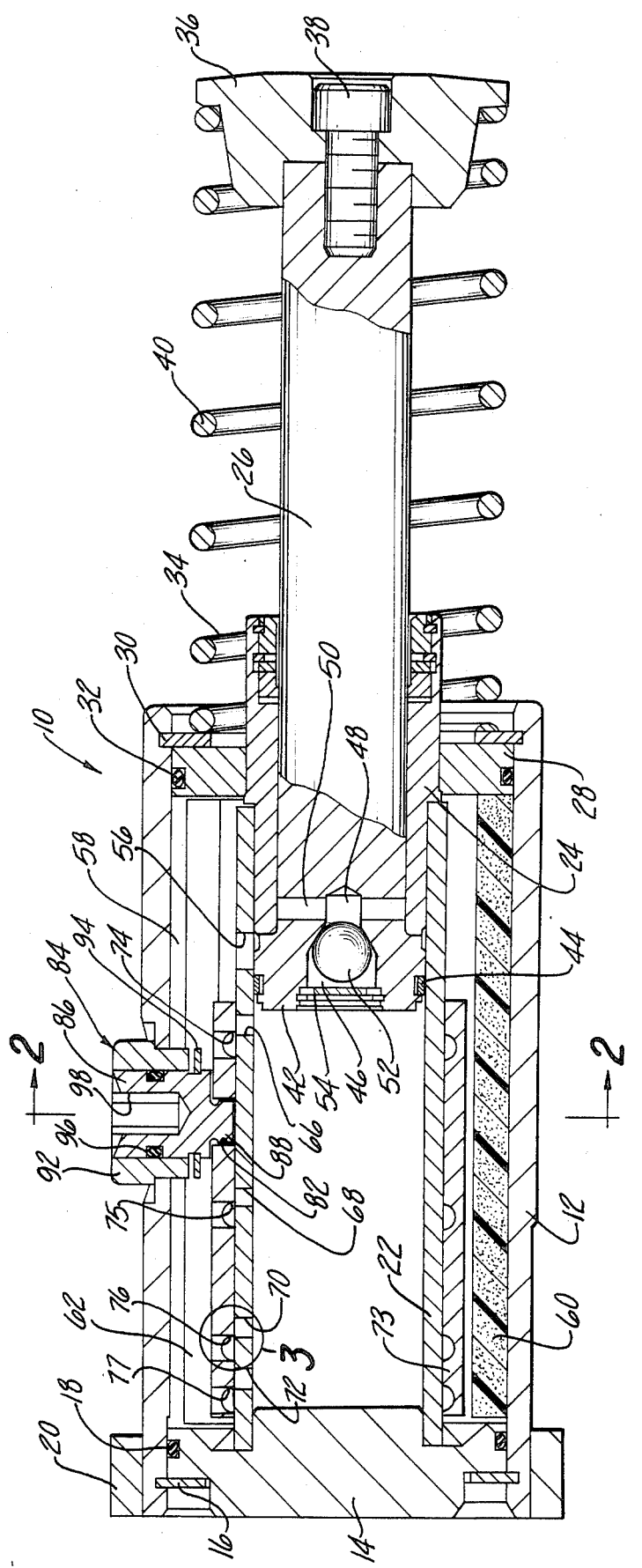
FIG. 1 is a fragmentary sectional view of a shock absorber according to the invention.

The shock absorber 10 of the present invention includes a main cylindrical outer tube 12. One end of tube 12, hereinafter called the rear end, is closed off by an end cap 14 secured to the inner wall of tube 12 by a retaining ring 16 with an O ring 18 providing a fluid seal therebetween. A radially extending flange 20 is provided to mount the shock absorber 10 to a suitable supporting surface.

A tubular metering cylinder 22 is fixedly supported at its rear end on cap 14 and projects forwardly into tube 12. The outer diameter of cylinder 22 is substantially smaller than the inner diameter of tube 12 so that an annular volume is formed therebetween. The forward inner wall of cylinder 22 engages a cylindrical sleeve bearing 24 adapted to slidingly support an elongated piston rod 26 that projects out of the forward end of the assembly. Bearing 24 is held in place by way of an annular bushing 28 fixed relative to the outer tube 12 by a retainer ring 30. An O ring 32 provides a fluid seal between bushing 28 and outer tube 12. An annular subassembly generally designated 34 provides sealing engagement between piston rod 26 and the forward inner end of bearing 24 in a known manner.

At its forward end piston rod 26 carries a button 36 secured by a screw 38 threaded into a hole at the end of the piston rod. Button 36 serves to bear against a machine part to be controlled by the shock absorber. A spiral spring 40 extends between the rear side of button 36 and retaining ring 30, thereby acting to return the piston rod 26 to its normal extended position after the machine part is moved away from the shock absorber. A piston head 42 is formed integrally with the rear end of piston rod 26. A groove on the outer diameter of piston head 42 carries a piston ring 44 bearing against the inner diameter of cylinder 22. The rear end of piston head 42 is formed with a central aperture 46 which communicates at its forward end with a central cavity 48. Cavity 48, in turn, communicates with a vertically extending bore 50. The concave surface between the larger aperture 46 and the smaller cavity 48 acts as a seat for a ball check valve 52. A valve retainer is provided rearwardly of the ball by way of retainer ring 54. When the piston moves rearwardly under the influence of a force exerted on button 36 by a machine part, the cavity 48 is sealed by the ball 52 and when the piston moves in the forward direction under the force of return spring 40, a free flow path is established through aperture 46, cavity 48 and bore 50.

Bore 50 communicates with an opening 56 in the forward end of cylinder 22. Opening 56 is in further communication with the annular volume 58 between the inner wall of tube 12 and the outer wall of cylinder 22. An accumulator pad 60 substantially fills the entire volume 58. Pad 60 is formed of cellular rubber which may be filled with nitrogen to give it a high degree of resilience and includes a slot 62 providing clearance for the adjustor mechanism and metering orifices as will be explained.

Four straight sided circular holes 66–72 are formed radially through the wall of cylinder 22. The four holes 66–72 are in longitudinal alignment with one another and their respective spacings are arranged at exponentially decreasing distances in the direction of the rear of cylinder 22.

A sleeve 73, best seen in FIG. 4, slideably surrounds the outer diameter of cylinder 22. Four internal grooves 74, 75, 76, and 77 are formed on the internal periphery of sleeve 73. The grooves are spaced at exponentially decreasing distances in the direction of the rear of cylinder 22 and generally correspond to and respectively coact with the four holes 66–72 in the cylinder. Each groove is of semicircular cross sectional configuration, as best seen in FIG. 3, and has a diameter slightly greater than the diameter of the cylinder holes 66–72. Grooves 74–77 lie in longitudinally spaced parallel planes normal to the axis of the cylinder and sleeve and have a uniform cross section throughout their circumferential extent. A straight sided hole 78, 79, 80, and 81 is formed in sleeve 73 in association with each groove. Each hole 78–81 opens at its outer end in the outer surface of sleeve 73 and opens at its inner end in the associated groove. Each hole 78–81 is centered on the associated groove and has a diameter generally corresponding to the diameter of the associated groove so that the hole intersects the associated groove at a relatively large diameter circular location close to but spaced from the inner periphery of the sleeve. Sleeve 73 further includes a relatively large diameter circular hole 82 positioned between grooves 74 and 75.

An adjustor mechanism seen generally at 84 is provided to vary the extent of overlap between grooves 74–77 and cylinder holes 66–72. Adjustor mechanism 84 includes a stubshaft 86 having a spherical off-center cam portion 88 formed at its innermost end. Spherical cam portion 88 is received within a circular hole 82 in sleeve 73. Shaft 86 is mounted for rotation by way of surrounding collar 92 fixed to outer tube 12. A retaining ring 94 lies within a circumferential groove in shaft 86 above cam 88 to restrict upward movement of the shaft. An O ring 96 provides a fluid seal between shaft 86 and collar 92. A socket 98 formed along the vertical center line of shaft 86 is adapted to receive a suitably conforming wrench for rotating the shaft.

Reference to FIGS. 5 and 6 will aid in the understanding of the meter size adjustment operation of the present invention where only one metering orifice defined by hole 70 and groove 76 is shown. It will be understood that the other metering orifices are adjusted in a similar manner. In the fully closed position of the shock absorber, as seen in FIG. 1 and as seen in dotted lines in FIG. 3, the grooves are longitudinally offset with respect to the associated holes in the cylinder with a small axial distance between the edge of the groove and the adjacent edge of the cylinder hole to ensure that no leakage occurs. When shaft 86 of adjuster mechanism 84 is rotated, the off-center spherical cam 88 moves sleeve 73 both axially and angularly with respect to fixed cylinder 22. This creates an orbiting pattern for grooves 74–77 relative to their associated cylinder holes 66–72. Specifically, when shaft 86 is rotated in a clockwise direction as viewed from above, the resulting orbiting motion of the sleeve causes the center point of groove 76 to travel along the radius designated by the numeral 100 in FIG. 5. When the shaft 86 is rotated 180°, there is full overlap created between the groove and the cylinder hole. However, the rate of change of overlap is not proportional to the degree of shaft rotation.

Specifically, with the specific arrangement shown in the disclosed embodiment, there is a slight overlap created between the groove and cylinder hole during the first 30° of rotation whereafter further increments of rotation produce larger and larger increments of overlap until 90° of rotation is reached whereafter each further increment of rotation produces smaller and smaller increments of overlap until the position of total overlap is achieved at 180° of shaft rotation. This relationship of adjustor shaft rotation to area of overlap during the first 180° of adjustor shaft rotation is shown graphically in FIG. 7. A reverse pattern, of course, characterizes the movement of the shaft through the remaining 180° of rotation. Once a desired overlap between the grooves and cylinder holes has been achieved, a set screw 102 is tightened to hold the shaft 86 in position.

The invention shock absorber will be seen to provide a very simple design which provides many important operational advantages. Specifically, the described orbital adjustment arrangement enables the adjustor to be fine tuned so that shock absorber characteristics may be precisely tailored to the weight or kinetic energy or other factors associated with the particular part to be decelerated.

Further, the invention design, including especially the smooth arcuate semicircular cross sectional configuration of the annular grooves in the sleeve, provides a shock absorber in which the metering point or orifice is precisely defined so that substantially all of the pressure drop across the shock absorber occurs at the metering point and occurs as substantially turbulent flow. Thus, since turbulent flow does not vary as the temperature of the fluid in the shock absorber increases with increased usage, the performance of the shock absorber remains fixed irrespective of the length of time that the shock absorber is in use. More specifically, the metering point or orifice in the invention design is defined as the overlap between the sleeve grooves and the cylinder ports. The invention design provides a knife edged metering orifice to give substantially turbulent flow at the metering orifice and the amount of surface area in contact with the oil upstream and downstream of the metering orifice is minimized so that upstream and downstream resistance to fluid flow is minimized and laminar flow, with its unwanted sensitivity to temperature change, is minimized. The smooth arcuate semicircular configuration of the annular grooves in the sleeve is critical to the performance of the shock absorber and, specifically, is critical to the ability of the shock absorber to allow the fluid downstream of the metering orifice to exit the shock absorber with a minimum of surface area contact and therefore a minimum of resistive laminar flow.

The invention semicircular groove design also eliminates the stress concentrations introduced into the sleeve in prior art square cross section groove design so as to produce a stronger and more durable sleeve, and provides a design which is easier to machine than the prior art square cross section grooves since less metal must be removed and less time and power must be expended in the grooving operation.

The invention semicircular groove design also minimizes fluid erosion as compared to the prior art square cross section groove designs since the contaminants in the oil, consisting for example of wear particles from the shock absorber mechanisms or sand from external contamination, move smoothly and quickly through the metering passage rather than erosively impacting against the angular design areas inherent in the square cross section groove design.

In total, the invention design provides a shock absorber which is durable, simple to manufacture, long lasting, capable of precise adjustment to achieve the desired performance characteristic and which, once adjusted to achieve the desired performance characteristic, will maintain the desired performance characteristic over extended periods of use and irrespective of wide changes in the temperature of the fluid in the shock absorber.

Whereas a preferred embodiment of the invention has been illustrated and described in detail, it will be apparent that various changes may be made in the disclosed embodiment without departing from the scope or spirit of the invention.

I claim:

1. A shock absorbing device for absorbing the kinetic energy of a moving member so as to decelerate the member, said device comprising:
   (A) a tubular cylinder having a plurality of longitudinally and exponentially spaced circular holes;
   (B) a piston slidable within said cylinder and adapted to be contacted by the moving member;
   (C) a sleeve slidably surrounding said cylinder and having
      (1) a plurality of annular internal grooves of semicircular cross section corresponding in number and longitudinal and exponential spacing to said holes in said cylinder, respectively lying in longitudinal and exponentially spaced parallel planes normal to the axis of the cylinder, and having a uniform cross section throughout their circumferential extent,
      (2) a circular hole associated with each groove having a diameter substantially corresponding to the diameter of the grooves, centered with respect to the associated groove, opening at its outer end in the outer surface of said sleeve, and opening at its inner end in the associated groove to coact with that groove and with the associated hole in said cylinder to define a metering passage for hydraulic fluid providing substantially turbulent hydraulic fluid flow therethrough so that said device is largely insensitive to variations in the temperature of the hydraulic fluid occurring over periods of usage, and
      (3) a circular adjuster hole; and
   (D) an adjuster member mounted for rotation about an adjuster axis generally normal to the axis of said cylinder and including an eccentric cam portion received in said circular adjuster hole in said cylinder and operative in coaction with said adjuster hole and in response to rotation of said adjuster member about said adjuster axis to create simultaneous relative radial and axial movement between said sleeve and said cylinder so that the grooves in said sleeve move in an orbital pattern relative to the holes in said cylinder to adjust the flow characteristic of the metering passages, rotation of said adjuster member through a series of adjustment positions respectively defining a plurality of positions of relative adjustment between said sleeve grooves and said cylinder holes to selectively provide a plurality of flow characteristics through the metering passages, and said adjuster member being operative to provide the same flow characteristics in more than one of its adjustment positions.

* * * * *